United States Patent
Prakash et al.

(10) Patent No.: US 10,861,019 B2
(45) Date of Patent: Dec. 8, 2020

(54) LOCATION VERIFICATION DURING DYNAMIC DATA TRANSACTIONS

(71) Applicant: Visa International Service Association, San Francisco, CA (US)

(72) Inventors: Gyan Prakash, Foster City, CA (US); Ajit Gaddam, Sunnyvale, CA (US); Glenn Powell, Fremont, CA (US); Taeho Kgil, Foster City, CA (US); Christian Aabye, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 928 days.

(21) Appl. No.: 15/074,941

(22) Filed: Mar. 18, 2016

(65) Prior Publication Data

US 2017/0270528 A1 Sep. 21, 2017

(51) Int. Cl.
*G06Q 20/40* (2012.01)
*G06Q 20/32* (2012.01)

(52) U.S. Cl.
CPC ..... *G06Q 20/4016* (2013.01); *G06Q 20/3224* (2013.01)

(58) Field of Classification Search
None
See application file for complete search history.

(56) References Cited

U.S. PATENT DOCUMENTS

| | | | | |
|---|---|---|---|---|
| 5,819,226 A | * | 10/1998 | Gopinathan | G06Q 20/00 705/44 |
| 6,167,517 A | * | 12/2000 | Gilchrist | G06F 21/32 713/182 |
| 6,282,522 B1 | * | 8/2001 | Davis | G06Q 20/02 235/375 |
| 6,928,569 B2 | * | 8/2005 | Rahman | G06F 13/385 713/400 |
| 7,127,068 B2 | * | 10/2006 | Sundaravel | H04L 29/06 380/258 |

(Continued)

FOREIGN PATENT DOCUMENTS

KR 20140143213 12/2014

OTHER PUBLICATIONS

Kuganathan et a. (Next Generation Smart Transaction Touch Points) (Year: 2014).*

(Continued)

*Primary Examiner* — Mamon Obeid
(74) *Attorney, Agent, or Firm* — Kilpatrick, Townsend & Stockton LLP

(57) ABSTRACT

Described herein is a platform and method for determining a confidence level associated with a transaction that utilizes dynamic data. In some embodiments, the confidence level is determined based on location data received in relation to the transaction. For example, some embodiments are directed to storing first location information collected from a mobile device provided in a request for the dynamic data, receiving second location information related to a transaction conducted using the dynamic data, and comparing the two with respect to the amount of time that has elapsed between collection of each to determine a confidence level associated with a likelihood that the transaction is authentic.

15 Claims, 5 Drawing Sheets

(56) References Cited

U.S. PATENT DOCUMENTS

| | | | | |
|---|---|---|---|---|
| 7,143,069 B2* | 11/2006 | Lacivita | | G06Q 20/04 |
| | | | | 705/64 |
| 7,503,489 B2* | 3/2009 | Heffez | | G06Q 20/32 |
| | | | | 235/380 |
| 7,567,934 B2* | 7/2009 | Flitcroft | | G06Q 20/24 |
| | | | | 705/37 |
| 7,747,536 B2* | 6/2010 | McGee | | G06Q 20/06 |
| | | | | 705/40 |
| 7,832,636 B2 | 11/2010 | Heffez et al. | | |
| 7,861,286 B2* | 12/2010 | M'Raihi | | G06F 21/552 |
| | | | | 726/5 |
| 8,019,679 B2* | 9/2011 | Bennett | | G06Q 20/4016 |
| | | | | 705/39 |
| 8,583,723 B2* | 11/2013 | Stewart | | H04W 64/00 |
| | | | | 709/202 |
| 8,615,468 B2* | 12/2013 | Varadarajan | | G06Q 20/40 |
| | | | | 705/44 |
| 8,640,197 B2* | 1/2014 | Heffez | | H04L 63/18 |
| | | | | 726/2 |
| 8,662,384 B2* | 3/2014 | Dodin | | G06Q 20/02 |
| | | | | 235/378 |
| 8,768,838 B1* | 7/2014 | Hoffman | | G06Q 40/00 |
| | | | | 705/44 |
| 8,827,154 B2* | 9/2014 | Hammad | | G06Q 20/3255 |
| | | | | 235/382 |
| 8,930,273 B2* | 1/2015 | Varadarajan | | G06Q 20/3433 |
| | | | | 705/44 |
| 9,032,217 B1* | 5/2015 | Brandwine | | G06F 21/44 |
| | | | | 713/185 |
| 9,038,886 B2* | 5/2015 | Hammad | | G06Q 20/385 |
| | | | | 235/375 |
| 9,124,583 B1* | 9/2015 | Amaladoss | | H04L 63/0876 |
| 9,154,952 B2* | 10/2015 | Dennis | | H04W 12/06 |
| 9,178,877 B1* | 11/2015 | Koneru | | H04W 12/10 |
| 9,483,765 B2* | 11/2016 | Sahadevan | | G06Q 20/4016 |
| 9,519,901 B1* | 12/2016 | Dorogusker | | G06Q 20/401 |
| 9,525,684 B1* | 12/2016 | Brandwine | | G06F 21/44 |
| 9,530,131 B2* | 12/2016 | Patterson | | G06Q 20/385 |
| 9,620,123 B2* | 4/2017 | Faians | | G06Q 30/0185 |
| 9,710,808 B2* | 7/2017 | Slepinin | | G06Q 20/3829 |
| 9,767,518 B1* | 9/2017 | Martin | | G06Q 40/10 |
| 9,774,595 B2* | 9/2017 | Omnes | | H04L 63/0853 |
| 9,775,029 B2* | 9/2017 | Lopez | | G06Q 20/32 |
| 9,830,595 B2* | 11/2017 | Anderson | | G06Q 20/12 |
| 9,858,781 B1* | 1/2018 | Campero | | G06F 9/451 |
| 9,871,875 B2* | 1/2018 | Bar-Yanai | | H04W 28/0268 |
| 9,911,121 B2* | 3/2018 | Wankmueller | | G06Q 20/32 |
| 9,940,934 B2* | 4/2018 | Sachdev | | G10L 17/04 |
| 9,967,747 B2* | 5/2018 | Rotter | | H04L 63/0861 |
| 10,069,864 B2* | 9/2018 | Anantharaju | | H04W 12/12 |
| 10,304,147 B2* | 5/2019 | Kelly | | G06Q 20/3224 |
| 10,373,148 B1* | 8/2019 | Dixon | | G06Q 20/3223 |
| 10,708,366 B2* | 7/2020 | Douglas | | G01S 1/042 |
| 2001/0027441 A1* | 10/2001 | Wankmueller | | G06Q 20/105 |
| | | | | 705/41 |
| 2001/0055393 A1* | 12/2001 | Sundaravel | | H04L 63/0428 |
| | | | | 380/258 |
| 2002/0174345 A1* | 11/2002 | Patel | | H04L 63/0428 |
| | | | | 713/186 |
| 2003/0021418 A1* | 1/2003 | Arakawa | | H04L 9/0891 |
| | | | | 380/277 |
| 2003/0163483 A1* | 8/2003 | Zingher | | G06Q 10/10 |
| 2004/0236696 A1* | 11/2004 | Aoki | | G06Q 20/403 |
| | | | | 705/50 |
| 2005/0027667 A1* | 2/2005 | Kroll | | G06Q 20/4037 |
| 2005/0043997 A1* | 2/2005 | Sahota | | G06Q 20/4018 |
| | | | | 705/16 |
| 2005/0097037 A1* | 5/2005 | Tibor | | G06K 9/00006 |
| | | | | 705/39 |
| 2005/0133588 A1* | 6/2005 | Williams | | G06Q 20/4016 |
| | | | | 235/379 |
| 2005/0137975 A1* | 6/2005 | Williams | | G06Q 40/08 |
| | | | | 705/40 |
| 2005/0149438 A1* | 7/2005 | Williams | | G07G 1/14 |
| | | | | 705/40 |
| 2005/0211771 A1* | 9/2005 | Onozu | | G06Q 20/341 |
| | | | | 235/383 |
| 2006/0129825 A1* | 6/2006 | Salomon | | G06F 21/33 |
| | | | | 713/176 |
| 2006/0190411 A1* | 8/2006 | Gava | | G06Q 10/10 |
| | | | | 705/64 |
| 2006/0229893 A1* | 10/2006 | Cole | | G06Q 50/184 |
| | | | | 705/39 |
| 2006/0271552 A1* | 11/2006 | McChesney | | G06Q 30/02 |
| 2007/0022058 A1* | 1/2007 | Labrou | | G07F 7/1008 |
| | | | | 705/67 |
| 2007/0071197 A1* | 3/2007 | Ryoo | | H04M 17/103 |
| | | | | 379/114.15 |
| 2008/0208759 A1* | 8/2008 | Royyuru | | G06Q 20/4012 |
| | | | | 705/72 |
| 2008/0210754 A1* | 9/2008 | Lovett | | G06Q 20/24 |
| | | | | 235/380 |
| 2008/0280626 A1* | 11/2008 | Choi | | H04L 67/18 |
| | | | | 455/456.1 |
| 2009/0102712 A1* | 4/2009 | Heffez | | G06Q 20/3224 |
| | | | | 342/357.55 |
| 2009/0187492 A1* | 7/2009 | Hammad | | G06Q 40/12 |
| | | | | 705/26.1 |
| 2009/0226050 A1* | 9/2009 | Hughes | | A45C 13/18 |
| | | | | 382/124 |
| 2009/0248560 A1* | 10/2009 | Recce | | G06Q 40/00 |
| | | | | 705/35 |
| 2009/0249077 A1* | 10/2009 | Gargaro | | G06Q 20/382 |
| | | | | 713/183 |
| 2010/0015993 A1* | 1/2010 | Dingler | | H04L 67/18 |
| | | | | 455/456.1 |
| 2010/0051684 A1* | 3/2010 | Powers | | G06Q 20/4016 |
| | | | | 235/379 |
| 2010/0131413 A1* | 5/2010 | Kranzley | | G06Q 20/349 |
| | | | | 705/66 |
| 2010/0199327 A1* | 8/2010 | Keum | | H04N 7/17318 |
| | | | | 726/3 |
| 2010/0262834 A1* | 10/2010 | Freeman | | G06F 21/33 |
| | | | | 713/184 |
| 2010/0274627 A1* | 10/2010 | Carlson | | G06Q 20/3224 |
| | | | | 705/51 |
| 2011/0112968 A1* | 5/2011 | Florek | | G06Q 20/3226 |
| | | | | 705/50 |
| 2011/0196791 A1* | 8/2011 | Dominguez | | G06Q 20/40 |
| | | | | 705/44 |
| 2011/0208601 A1* | 8/2011 | Ferguson | | G06Q 20/18 |
| | | | | 705/16 |
| 2011/0208658 A1* | 8/2011 | Makhotin | | G06Q 20/401 |
| | | | | 705/75 |
| 2011/0265158 A1* | 10/2011 | Cha | | G06F 21/57 |
| | | | | 726/6 |
| 2011/0307703 A1* | 12/2011 | Ogg | | G06Q 20/382 |
| | | | | 713/176 |
| 2012/0018511 A1* | 1/2012 | Hammad | | G06Q 20/385 |
| | | | | 235/380 |
| 2012/0023568 A1* | 1/2012 | Cha | | G06F 21/335 |
| | | | | 726/10 |
| 2012/0028609 A1* | 2/2012 | Hruska | | H04W 12/02 |
| | | | | 455/411 |
| 2012/0041881 A1* | 2/2012 | Basu | | G06Q 20/3672 |
| | | | | 705/67 |
| 2012/0123841 A1* | 5/2012 | Taveau | | G06Q 20/32 |
| | | | | 705/14.23 |
| 2012/0136796 A1* | 5/2012 | Hammad | | G06Q 20/385 |
| | | | | 705/67 |
| 2012/0185398 A1* | 7/2012 | Weis | | G06Q 20/401 |
| | | | | 705/75 |
| 2012/0287022 A1* | 11/2012 | Queen | | G09G 5/006 |
| | | | | 345/2.1 |
| 2012/0290389 A1* | 11/2012 | Greenough | | G06Q 20/3224 |
| | | | | 705/14.53 |
| 2012/0290478 A1* | 11/2012 | Crofts | | G06Q 40/00 |
| | | | | 705/44 |

(56) References Cited

U.S. PATENT DOCUMENTS

| | | | |
|---|---|---|---|
| 2012/0330837 A1* | 12/2012 | Persaud | G06Q 20/20 705/44 |
| 2013/0042307 A1* | 2/2013 | Imamura | H04L 69/28 726/4 |
| 2013/0054474 A1* | 2/2013 | Yeager | G06Q 20/02 705/71 |
| 2013/0110728 A1* | 5/2013 | Kobres | G09C 5/00 705/75 |
| 2013/0132283 A1* | 5/2013 | Hayhow | G06Q 20/1085 705/67 |
| 2013/0144888 A1* | 6/2013 | Faith | G06F 16/338 707/748 |
| 2013/0159704 A1* | 6/2013 | Chandrasekaran | G06F 21/57 713/156 |
| 2013/0165071 A1* | 6/2013 | Jonasson | H04L 12/1457 455/406 |
| 2013/0173474 A1 | 7/2013 | Ranganathan et al. | |
| 2013/0191290 A1* | 7/2013 | Glendenning | G06Q 20/40 705/71 |
| 2013/0226800 A1* | 8/2013 | Patel | G06Q 20/3224 705/44 |
| 2013/0238536 A1* | 9/2013 | Outwater | G07F 15/005 706/12 |
| 2013/0305328 A1* | 11/2013 | Leung | H04L 63/0807 726/6 |
| 2014/0040139 A1 | 2/2014 | Brudnicki et al. | |
| 2014/0040145 A1* | 2/2014 | Ozvat | G06Q 20/401 705/64 |
| 2014/0052497 A1* | 2/2014 | Varghese | G06Q 30/0205 705/7.34 |
| 2014/0058865 A1* | 2/2014 | Yang | G06Q 20/327 705/21 |
| 2014/0067683 A1* | 3/2014 | Varadarajan | G06Q 20/04 705/44 |
| 2014/0114857 A1* | 4/2014 | Griggs | G06Q 40/00 705/44 |
| 2014/0114860 A1* | 4/2014 | Ozvat | G06Q 20/382 705/64 |
| 2014/0136838 A1* | 5/2014 | Mossbarger | H04L 9/006 713/156 |
| 2014/0279504 A1 | 9/2014 | Cook et al. | |
| 2014/0279526 A1* | 9/2014 | Jackson | G06Q 20/381 705/44 |
| 2014/0281531 A1* | 9/2014 | Phegade | H04L 9/083 713/168 |
| 2014/0283120 A1* | 9/2014 | Mao | H04L 63/107 726/28 |
| 2014/0310159 A1* | 10/2014 | Zoldi | G06Q 30/02 705/39 |
| 2014/0337138 A1* | 11/2014 | Chitalia | G06Q 20/20 705/14.64 |
| 2014/0357295 A1* | 12/2014 | Skomra | H04W 4/02 455/456.1 |
| 2014/0372308 A1* | 12/2014 | Sheets | G06Q 20/32 705/44 |
| 2014/0375422 A1* | 12/2014 | Huber | G07C 9/00571 340/5.61 |
| 2015/0006330 A1* | 1/2015 | Polack | G06Q 30/0635 705/26.81 |
| 2015/0032625 A1* | 1/2015 | Dill | G06Q 20/40 705/44 |
| 2015/0046336 A1* | 2/2015 | Cummins | G06Q 20/3829 705/65 |
| 2015/0081566 A1* | 3/2015 | Slepinin | G06Q 20/3829 705/69 |
| 2015/0088674 A1* | 3/2015 | Flurscheim | G06Q 20/3274 705/17 |
| 2015/0089590 A1* | 3/2015 | Krishnan | A61N 1/37235 726/3 |
| 2015/0127547 A1* | 5/2015 | Powell | G06Q 20/385 705/67 |
| 2015/0170134 A1 | 6/2015 | Gum | |
| 2015/0178724 A1* | 6/2015 | Ngo | H04L 9/0869 705/71 |
| 2015/0180836 A1* | 6/2015 | Wong | G06Q 20/327 713/172 |
| 2015/0227935 A1* | 8/2015 | Adjaoute | G06Q 50/265 705/44 |
| 2015/0246338 A1* | 9/2015 | Winks | B01J 20/12 210/683 |
| 2015/0262161 A1* | 9/2015 | McMullan | G06Q 20/385 705/39 |
| 2015/0262180 A1* | 9/2015 | Hambleton | G06Q 40/02 705/71 |
| 2015/0312038 A1* | 10/2015 | Palanisamy | G06F 21/33 713/155 |
| 2015/0324771 A1* | 11/2015 | Capps | G06Q 20/102 705/40 |
| 2015/0339664 A1* | 11/2015 | Wong | H04L 9/3236 705/71 |
| 2016/0036790 A1* | 2/2016 | Shastry | H04L 63/0876 713/168 |
| 2016/0057248 A1* | 2/2016 | Tankha | H04L 67/306 726/6 |
| 2016/0057619 A1* | 2/2016 | Lopez | G06F 9/455 380/247 |
| 2016/0063500 A1* | 3/2016 | Sherlock | G06Q 20/40 705/44 |
| 2016/0078445 A1* | 3/2016 | Einhorn | G06Q 20/4014 705/21 |
| 2016/0080364 A1* | 3/2016 | Karimzadeh | G06F 21/6245 726/6 |
| 2016/0085955 A1* | 3/2016 | Lerner | G06F 21/31 726/20 |
| 2016/0092872 A1* | 3/2016 | Prakash | G06Q 20/322 705/65 |
| 2016/0098790 A1* | 4/2016 | Herman | G06Q 30/0633 705/39 |
| 2016/0140561 A1* | 5/2016 | Cowan | G06Q 20/20 705/26.35 |
| 2016/0148197 A1* | 5/2016 | Dimmick | G06Q 20/385 705/67 |
| 2016/0150394 A1* | 5/2016 | Varoglu | H04W 4/029 455/418 |
| 2016/0189159 A1* | 6/2016 | Luk | G06Q 20/3224 705/39 |
| 2016/0191236 A1* | 6/2016 | Smirnoff | H04L 63/062 713/171 |
| 2016/0217467 A1* | 7/2016 | Smets | G06Q 20/3226 |
| 2016/0241402 A1* | 8/2016 | Gordon | H04L 9/3231 |
| 2016/0253651 A1* | 9/2016 | Park | G06Q 20/322 705/39 |
| 2016/0267280 A1* | 9/2016 | Mansour | H04L 9/0861 |
| 2016/0275461 A1* | 9/2016 | Sprague | G06Q 20/0655 |
| 2016/0283942 A1* | 9/2016 | Chitragar | G06Q 20/327 |
| 2016/0286393 A1* | 9/2016 | Rasheed | H04L 9/3215 |
| 2016/0294556 A1* | 10/2016 | Vortriede | H04L 9/3242 |
| 2016/0364730 A1* | 12/2016 | Rans | G06Q 20/40145 |
| 2016/0380774 A1* | 12/2016 | Lovelock | G06Q 50/265 713/169 |
| 2017/0004484 A1* | 1/2017 | Seol | G06Q 20/327 |
| 2017/0011404 A1* | 1/2017 | Clower | G06Q 40/02 |
| 2017/0061419 A1* | 3/2017 | Kim | G06Q 20/102 |
| 2017/0068953 A1* | 3/2017 | Kim | G06Q 20/382 |
| 2017/0085563 A1* | 3/2017 | Royyuru | G06Q 30/0277 |
| 2017/0109740 A1* | 4/2017 | Besch | G06Q 20/102 |
| 2017/0132629 A1* | 5/2017 | Jung | G06Q 20/409 |
| 2017/0200160 A1* | 7/2017 | Kumar | H04L 63/083 |
| 2017/0228723 A1* | 8/2017 | Taylor | H04L 63/0807 |
| 2017/0236113 A1* | 8/2017 | Chitalia | G06Q 20/3276 705/44 |
| 2017/0243417 A1* | 8/2017 | Manikantan Shila | B66B 1/468 |
| 2017/0251025 A1* | 8/2017 | Varley | H04L 9/3247 |
| 2017/0262842 A1* | 9/2017 | Subbarayan | G06Q 20/38215 |
| 2017/0270527 A1* | 9/2017 | Rampton | G06Q 20/4016 |
| 2017/0270528 A1* | 9/2017 | Prakash | G06Q 20/3224 |
| 2017/0300898 A1* | 10/2017 | Campero | H04L 9/3236 |
| 2017/0308895 A1* | 10/2017 | Srivastava | H04L 9/0819 |
| 2017/0316390 A1* | 11/2017 | Smith | H04L 9/0861 |

(56) References Cited

U.S. PATENT DOCUMENTS

| | | | |
|---|---|---|---|
| 2017/0330181 A1* | 11/2017 | Ortiz | G06Q 30/0226 |
| 2017/0330188 A1* | 11/2017 | Canh | G06Q 20/385 |
| 2017/0346850 A1* | 11/2017 | Jin | G06F 21/335 |
| 2017/0366347 A1* | 12/2017 | Smith | H04L 9/3221 |
| 2017/0373852 A1* | 12/2017 | Cassin | H04L 63/062 |
| 2018/0006821 A1* | 1/2018 | Kinagi | H04W 12/02 |
| 2018/0026973 A1* | 1/2018 | Le Saint | H04W 12/0609 |
| | | | 713/168 |
| 2018/0096347 A1* | 4/2018 | Goeringer | G06Q 20/3825 |
| 2018/0114220 A1* | 4/2018 | Ekberg | G06Q 20/3829 |
| 2018/0122031 A1* | 5/2018 | Chabanne | G06Q 20/0655 |
| 2018/0176017 A1* | 6/2018 | Rodriguez | H04L 63/0861 |
| 2018/0181948 A1* | 6/2018 | Sharma | G06Q 20/3274 |
| 2018/0197263 A1* | 7/2018 | Pearson | G06Q 50/265 |
| 2018/0198604 A1* | 7/2018 | Hayton | G06F 15/0208 |
| 2018/0254898 A1* | 9/2018 | Sprague | H04L 9/0866 |
| 2018/0255460 A1* | 9/2018 | Hammad | G06Q 20/4018 |
| 2018/0268406 A1* | 9/2018 | Rice | G06Q 20/34 |
| 2018/0276661 A1* | 9/2018 | van Wingerden | G06Q 20/3823 |
| 2019/0139023 A1* | 5/2019 | Vyas | G06Q 20/3224 |
| 2019/0281406 A1* | 9/2019 | Lalka | H04W 4/02 |
| 2019/0325509 A1* | 10/2019 | Nair | H04W 4/33 |
| 2020/0118137 A1* | 4/2020 | Sood | G06F 3/04817 |

OTHER PUBLICATIONS

PCT/US2017/020247 , "International Search Report and Written Opinion", dated Jun. 9, 2017, 13 pages.

EP17767157.5 , "Extended European Search Report", dated Feb. 5, 2019, 8 pages.

Godbert et al., "The Future of Contactless Mobile Payment: With or Without Secure Element?", Nextendis, Available Online at, URL: http://www.nextendis.com/wp-content/uploads/2015/06/Future-contactless-payment-WP-byNextendis.pdf, [Retrieved on Jan. 25, 2019], Feb. 1, 2015, pp. 1-12.

\* cited by examiner

LOCATION VERIFICATION DURING DYNAMIC DATA TRANSACTIONS

BACKGROUND

As computing power increases, it is becoming more and more important to provide secure means of performing transactions. Hackers and other fraudsters are increasingly gaining access to account numbers, enabling a high level of identity fraud and theft. One solution to this problem is the use of alternative account representations that are tied to a specific account instead of using real account numbers. However, even these alternative account representations can be subject to theft and misappropriation. Accordingly, there is a need to provide ever increasing security for electronic transactions.

Embodiments of the invention address these and other problems, individually and collectively.

BRIEF SUMMARY

Embodiments of the invention are directed to a platform for determining a confidence level associated with a transaction conducted using dynamic data based on location data received in relation to the transaction. In particular, embodiments are directed to storing first location information collected from a mobile device provided in a request for the dynamic data, receiving second location information related to a transaction conducted using the dynamic data, and comparing the two with respect to the amount of time that has elapsed between collection of the two location information to determine a likelihood that the transaction is authentic. In some embodiments, the dynamic data used in the transaction can be, for example, a dynamic account identifier such as a token, and/or a dynamic key such as a limited-use key or an access key, etc.

One embodiment of the invention is directed to a method comprising receiving a request for dynamic data that includes a first location information associated with a mobile device. Upon receiving the request, the method can include generating the dynamic data for the mobile device, storing the first location information and associating the first location information with the dynamic data, and transmitting the dynamic data to the mobile device. Upon receiving an authorization request message for a transaction comprising a second location information associated with the transaction, and the dynamic data or transaction data generated from the dynamic data, the method comprises comparing a first location corresponding to the first location information associated with the dynamic data and a second location corresponding to the second location information associated with the transaction. A confidence level is then determined for the transaction based at least in part on the comparison of the first location and the second location.

Another embodiment of the invention is directed to a server computer comprising a processor and computer-readable medium coupled to the processor, where the computer-readable medium comprises code, executable by the processor, for performing a method. The method comprises receiving a request for dynamic data. The request may include a first location information associated with a mobile device. Upon receiving the request, the method can include generating the dynamic data for the mobile device, storing the first location information and associating the first location information with the dynamic data, and transmitting the dynamic data to the mobile device. Upon receiving an authorization request message for a transaction comprising a second location information associated with the transaction, and the dynamic data or transaction data generated from the dynamic data, the method comprises comparing a first location corresponding to the first location information associated with the dynamic data and a second location corresponding to the second location information associated with the transaction. A confidence level is then determined for the transaction based at least in part on the comparison of the first location and the second location.

These and other embodiments of the invention are described in further detail below.

DETAILED DESCRIPTION

Figure 1:
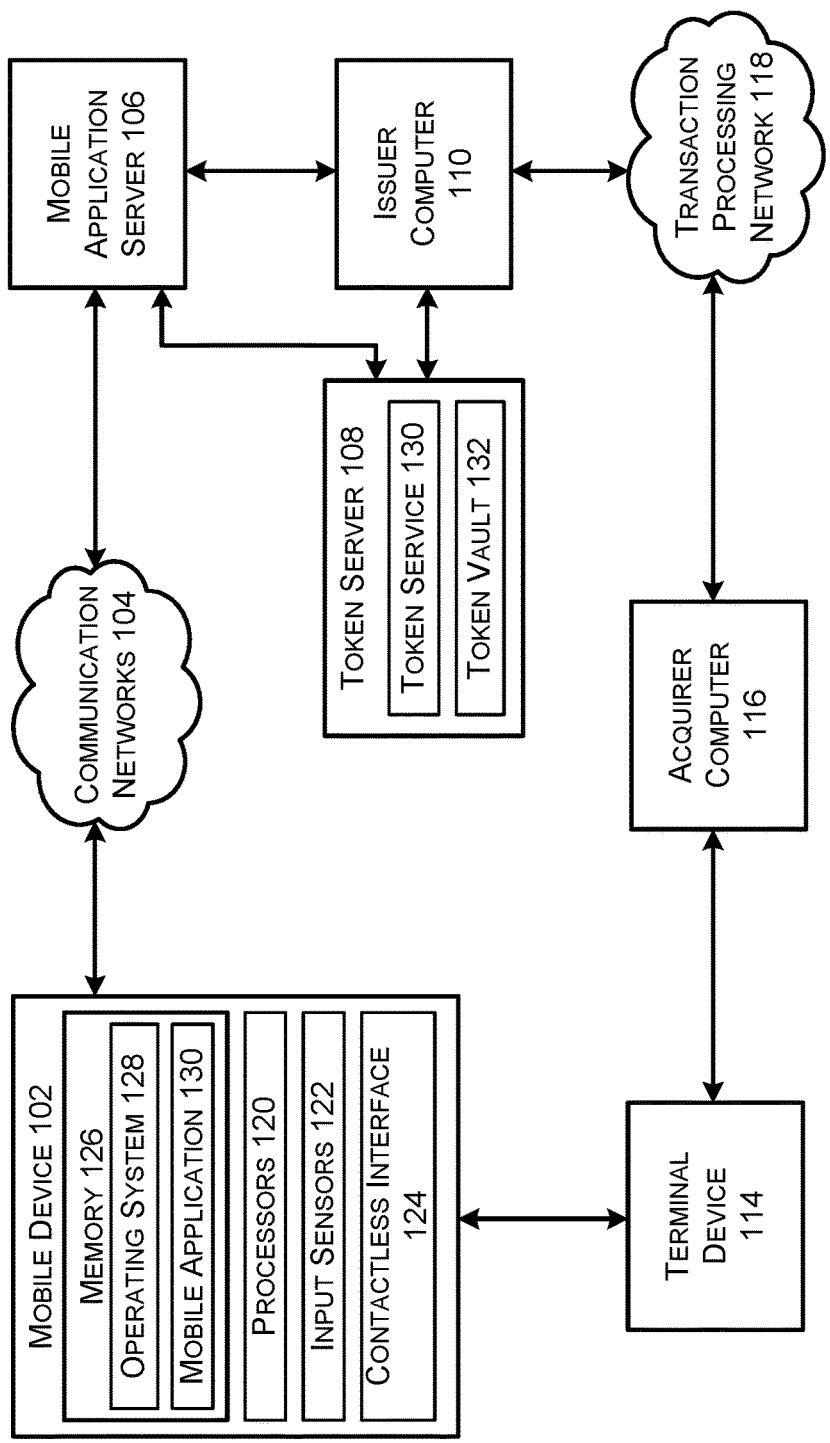
FIG. 1 depicts an example transaction system architecture capable of implementing at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device. In some embodiments, an access device may also be referred to as a terminal device.

A "access key" may be any identifier or sequence of characters configured to enable access to a resource. In some embodiments, the resource accessed using an access key can be a restricted or secure area, restricted or secure storage, etc. In some embodiments, an access key may be a string of characters that corresponds to account information. In some embodiments, an access key may be a password or code. In some embodiments, an access key can be a cryptographic key that is used to generate information to gain access to a resource. An access key can also be a dynamic key that changes over time, and/or a limited-use key whose usage is limited by one or more limited-use conditions.

"Account parameters" may refer to information relating to an account that can be used to conduct a transaction on the account. Examples of account parameters may include information that can be used to identify an account of the user (e.g., real account identifier, alternate account identifier, dynamic account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. An example of a dynamic account parameter may include a dynamic key (e.g., limited use key, access key, etc.). In some embodiments, a dynamic account parameter may include a dynamic account identifier such as a token, a dynamic primary account number (PAN), etc. A semi-static account parameter may be an account parameter that has an extended lifespan that is longer than a dynamic account parameter, and can be replenished less frequently than a dynamic account parameter or not at all during the lifetime of the account. Examples of a semi-static account parameter may include a real account identifier such as a real PAN.

An "acquirer" may typically be a business entity (e.g., a commercial bank) that has a business relationship with a particular merchant or other entity. Some entities can perform both issuer and acquirer functions. Some embodiments may encompass such single entity issuer-acquirers The term "authentication" and its derivatives may refer to a process by which the credential of an endpoint (including but not limited to applications, people, devices, processes, and systems) can be verified to ensure that the endpoint is who they are declared to be.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "cryptographic key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. A cryptographic key may also be referred to as an encryption key.

"Dynamic data" may refer to data that changes over time. Certain types of dynamic data can be used to conduct transactions. Examples of such dynamic data may include dynamic account parameters such as a dynamic key (e.g., limited-use key, access key, etc.), a dynamic account identifier (e.g., token, dynamic PAN), etc.

A "dynamic key" can be a key that changes over time. A dynamic key may be any identifier or sequence of characters, and the identifier or sequence of characters can be changed or refreshed over time. Examples of a dynamic key may include an access key that is configured to enable access to a resource, or a limited-use key whose usage is restricted by one or more limited-use conditions.

A "limited-use key" may be a key that is valid as long as a limited-use condition has not been exceeded. In some embodiments, a limited-use key may be associated with multiple limited-use conditions, such that the limited-use key may be valid until one or more of those conditions have been met. In some embodiments, a limited-use key can be a cryptographic key. In some embodiments, a limited-use key can also be an access key.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "limited-use condition" may refer to a condition that limits the usage of a piece of information. A limited-use condition may be exceeded or exhausted when the underlying condition is met. For example, a limited-use condition may include a time-to-live that indicates an amount of time for which a piece of information is valid, and once that amount of time has elapsed, the limited-use condition is exceeded or exhausted, and the piece of information may become invalid and may no longer be used. As another example, a limited-use condition may include a number of times that a piece of information can be used, and once the piece of information has been used for that number of times, the limited-use condition is exceeded or exhausted, and the piece of information may become invalid and may no longer be used.

A "merchant" may typically be an entity that engages in transactions and can sell goods or services, or provide access to goods or services.

A "mobile application" may be any application stored on, and executed from, a mobile device. In some embodiments, a mobile application may be used to make a payment via a mobile device. In some embodiments, a mobile payment application may be an e-wallet or digital wallet application. In some embodiments, the mobile payment application may be linked to one or more payment accounts. In some embodiments, the mobile payment application may store one or more "tokens" or representations of payment accounts. In some embodiments, the mobile payment application may be linked to a decentralized virtual currency (e.g., bitcoins). In some embodiments, a mobile payment application may include an application used to complete a transaction without the use of currency. For example, the mobile payment application may complete a transaction using reward points or store credit.

A "mobile device" may be a device that includes one or more electronic components (e.g., an integrated chip) that can be transported and operated by a user. A mobile device may provide remote communication capabilities to a network. The mobile device can be configured to transmit and receive data or communications to and from other devices. A mobile device may be in the form of any portable device such as a mobile phone (e.g., smart phone, cellular phone, etc.), a tablet, a portable media player, a personal digital assistant device (PDA), a wearable computing device (e.g., a smart watch), an electronic reader device, etc., or in the form of a card (e.g., a smart card) or a fob, etc. Examples of mobile devices may also include portable computing devices (e.g., laptops, netbooks, ultrabooks, etc.). A mobile device can also be in the form of a vehicle (e.g., an automobile) or be integrated as part of a vehicle (e.g., infosystem of a vehicle).

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." During a transaction, instead of using a real account identifier (e.g., a PAN) to identify the account of the user, a token can be used instead to identify the account. By using a token as a substitute for an account identifier, the risk of comprising real account information can be mitigated. In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

Details of some embodiments of the present invention will now be described.

Embodiments of the invention are directed to techniques for a transaction system in which a transaction conducted using dynamic data may be approved or declined based at least in part on a confidence level associated with the transaction. The transaction system may collect information related to a location from which the dynamic data is requested, a location at which a transaction is conducted, and time information for both when the dynamic data is requested and when the transaction is conducted. In some embodiments, the confidence level may be calculated based a distance between the two locations, and the amount of time between the dynamic data request and the transaction.

FIG. 1 depicts an example transaction system architecture 100 capable of implementing at least some embodiments of the current disclosure. In FIG. 1, a mobile device 102 is depicted as being in communication, via one or more communication networks 104, with a mobile application server 106. The mobile application server 106 may be in communication with a token server 108 and/or an issuer computer 110. In some embodiments, the mobile device 102 may be used to conduct a transaction with, via a terminal device 114. Upon receiving an indication that a transaction is to be conducted, the terminal device 114 may transmit an authorization request message to an acquirer computer 116, which may in turn forward the authorization request message to the issuer computer 110 via a transaction processing network 118 for authorization. The issuer computer 110 may authorize or decline the transaction based on one or more factors associated with the transaction. In some embodiments, the issuer computer 110 may base this decision, at least partially, on a confidence level associated with the transaction.

The mobile device 102 may be any type of portable communication device such as, but not limited to, a mobile phone, a smart phone, a personal digital assistant (PDA), a laptop computer, a tablet PC, etc. Additionally or alternatively, the mobile device 102 may be any type of wearable technology device, such as a watch, earpiece, glasses, etc. It may also be an automobile with remote communication capabilities.

The mobile device 102 may include one or more processors 120 capable of processing user input. The mobile device 102 may also include one or more input sensors 122 for receiving user or environmental input. There may be a variety of input sensors 122 capable of detecting user or environmental input, such as a keyboard, a mouse or pointer device, accelerometer, camera, microphone, satellite positioning system receiver (e.g., GPS receiver), etc. In some embodiments, the mobile device 102 may include a contactless interface 124 configured to enable communication between the mobile device 102 and terminal device 114. Examples of contactless interface 124 may include one or more radio frequency (RF) transceivers configured to send and receive communications using near-field communications (NFC), or other radio frequency or wireless communication protocols such as Bluetooth, Bluetooth low-energy (BLE), Wi-Fi, iBeacon, etc. In some embodiments, contactless interface 124 may include an optical interface (e.g., a display screen) to present payment information in the form of an image such as a quick response (QR) code, or other machine readable code to the terminal device 114 in embodiments in which the terminal device 114 includes an optical code scanner or reader. Embodiments of one or more modules on the mobile device 102 may be stored and executed from its memory 126.

Turning to the contents of the memory 126 in more detail, the memory 126 may include an operating system 128 and one or more modules configured to cause the processors 120 to carry out instructions in accordance with at least some embodiments. For example, the memory 126 may include a mobile application 130 configured to work with the processor 120 to communicate transaction data (e.g., token and/or other account information) to terminal device 114 in order to complete a transaction. In addition, the mobile application may be configured to convey location data for the mobile device 102, and provide location data, for example, to the terminal device 114 to conduct the transaction.

In some embodiments, the mobile application 130 may comprise code, that, when executed by the processor 120, is configured to provide one or more pieces of data to an external device. For example, the mobile application 130 may comprise code executable by the processor 120 to receive location information from input sensors 122 and provide that location information to terminal device 114. In some embodiments, the mobile application 130 may be configured to manage a payment account that utilizes dynamic data (e.g., dynamic account identifier such as a token, and/or a dynamic key) to conduct transactions. For example, the mobile application 130 may be configured to cause the mobile device 102 to request the dynamic data from a token server 108 via the mobile application server 106. The mobile application 130 may be configured to cause location data to be included In the request to the token server 108 for the dynamic data. In some embodiments, the mobile device may generate a cryptogram to conduct a transaction using the dynamic data (e.g., dynamic key). In some embodiments, the mobile application 130 may be configured to cause the mobile device 102 to provide the dynamic data and/or transaction data generated from the dynamic data such as a cryptogram to terminal device 114 in order to complete a transaction. The mobile application 130 may also be configured to cause location data to be included In the information provided to the terminal. In some embodiments, a user of the mobile device 102 may be required to log into the mobile application 130, or otherwise confirm his or her identity, prior to using the mobile application 130 to conduct a transaction. In some embodiments, the mobile application 130 may be a mobile wallet application stored on, and executed from, a smart phone device. The mobile application 130 may provide access to a decentralized virtual currency (e.g., bitcoin). The mobile application 130 may be configured to provide a "token" or other representation of a payment account to an access device in order to complete a transaction. In some embodiments, the mobile application 130 may include account information that will enable a person to access a secure location or resource.

In some examples, the communication network 104 and/or the transaction processing network 118 may include any one or a combination of many different types of networks, such as cable networks, the Internet, wireless networks, cellular networks, and other private and/or public networks. In addition, the communication network 104 and/or transaction processing network 118 may comprise multiple different networks. For example, the mobile device 102 may utilize a wireless local area network (WLAN) to communicate with a wireless router, which may then route the communication over a public network (e.g., the Internet) to the mobile application server 106. In some embodiments, the transaction processing network 118 may be an electronic payment network (e.g., VisaNet).

Mobile application server 106 may be any computing device or plurality of computing devices configured to provide backend support for the mobile application 130. In some embodiments, the mobile application server 106 may be configured to perform one or more calculations on behalf of the mobile application 130 stored on, and executed from, the mobile device 102. In some embodiments, the mobile application 130 may be in periodic communication with the mobile application server 106. For example, the mobile application 130 may receive updates or other instructions from the mobile application server 106. In some embodiments, the mobile application 130 and mobile application server 106 may utilize a proprietary encryption and/or decryption scheme to secure communications between the two.

Token server 108 may be any computing device or plurality of computing devices configured to enable secure access to account information using tokens (substitute identifiers for account information). Token server 108 may be configured to implement or be provided with access to a token service 130 and/or a token vault 132. Token service 130 may be any system capable of being used to generate, process, and maintain tokens and related account information such as dynamic keys. As indicated above, a token may have its own set of use restrictions, and token service 130 may manage the deployment and usage of the tokens according to their use restrictions. Token service 130 may be in communication with token vault 132 where the generated tokens are stored in relation to account information. Specifically, token vault 132 may maintain a mapping between a token and the real account identifier (e.g., PAN) represented by the token. During transaction processing, token vault 132 may be queried to retrieve the real account identifier or PAN associated with the token.

Token server 108 may also be configured to generate a dynamic key (e.g., a limited-use key) associated with a token and/or account. For example, the token server 108 may provide a dynamic key to a mobile device that may be used to generate a cryptogram to conduct a transaction. When verifying a token provided in an authorization request is authentic, the token server may independently generate a cryptogram from the dynamic key associated with the token and compare it to a cryptogram provided in the authorization request message. The token server 108 may also be configured to determine, based on location information provided at the time of generation of the dynamic key and location information provided at the time of a transaction, a confidence level associated with the transaction.

Issuer computer 110 may be any computing device or plurality of computing devices configured to receive an authorization request message for a transaction, authorize or decline the transaction, and provide an authorization response message based on whether the transaction has been authorized or declined. In some embodiments, the issuer computer 110 may be configured to determine, based on location information provided at the time of the request for the dynamic data and location information provided at the time of a transaction, a confidence level associated with the transaction. The issuer computer 110 may determine whether to authorize or decline the transaction based on a confidence level associated with the transaction.

Terminal device 114 may be any computing device or plurality of computing devices configured to complete a transaction. In some embodiments, a terminal device may be a point of sale (POS) device such as a register. In some embodiments, a terminal device 114 may restrict access to a resource or service. In some embodiments, the terminal device 114 may be owned and/or operated by one of the parties to a transaction that the terminal device 114 is configured to complete. In some embodiments, the terminal device 114 may be configured to transmit transaction information to a mobile device 102 and in response, receive information (e.g., account information) from the mobile device 102, which may be forwarded to an acquirer.

Acquirer computer 116 may be any computing device or plurality of computing devices configured to process transaction information received from the terminal device 114 and generate an authorization request message to be transmitted to the issuer computer 110. In some embodiments, the acquirer computer 116 and the issuer computer 110 may be the same entity. For example, the issuer computer 110 may be configured to receive transaction information from the terminal device 114 and authorize or decline the transaction. In some embodiments, the acquirer may be a third party entity (e.g., an entity unaffiliated with either the issuer computer 110 or the terminal device 114).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
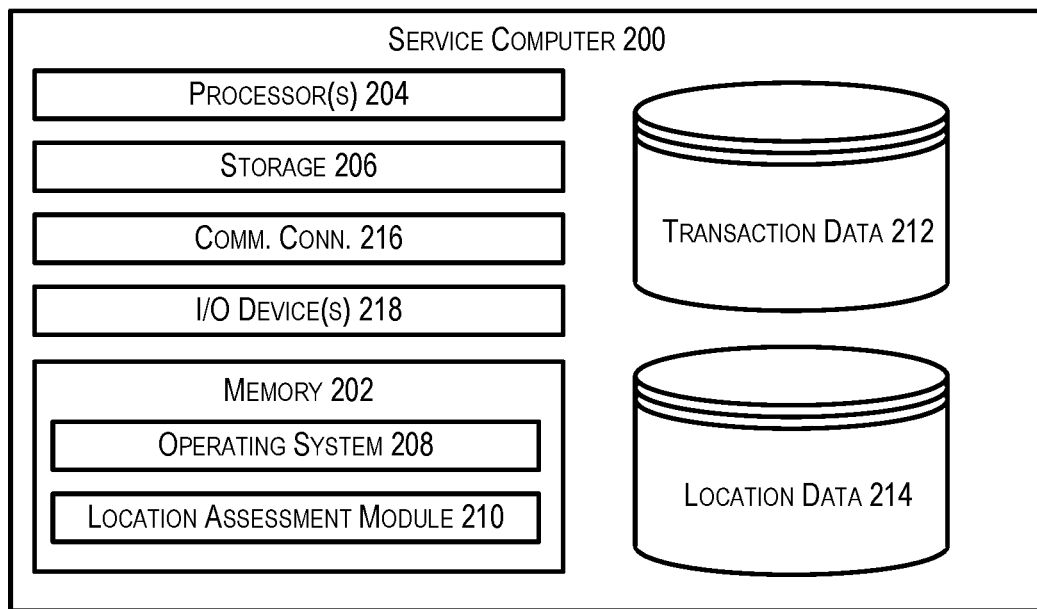
FIG. 2 depicts an illustrative example of an service computer capable of determining a confidence level for a transaction based on location data provided in an authorization request and location data provided at the time of a request for dynamic data in accordance with at least some embodiments.

FIG. 2 depicts an illustrative example of an service computer 200 capable of determining a confidence level for a transaction based on location data provided in an authorization request and location data provided at the time of a request for dynamic data in accordance with at least some embodiments. In some embodiments, the service computer 200 may be an example issuer computer 110 of FIG. 1. In some embodiments, the service computer 200 may be an example token server 108 of FIG. 1.

The service computer 200 may be any type of computing device, including a remotely located server computer. Additionally, it should be noted that in some embodiments, the service computer 200 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service computer 200, the memory 202 may be volatile (such as random access memory (RAM)) and/or non-volatile (such as read-only memory (ROM), flash memory, etc.). The issuer computer 110 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for assessing a location associated with one or more transactions and comparing that location to a location associated with the request of the dynamic data (location assessment module 210). The memory 202 may also include transaction data 212, which provides data associated with one or more previously conducted transactions and location data 214, which provides location data associated with one or more mobile devices. In some embodiments, the transaction data 212 and/or the location data 214 may be located outside of the service computer 200. For example, one or more of these databases may be maintained by a third party entity (an entity unaffiliated with the service computer 200).

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the mobile device 104 or the service computer 200. The service computer 200 may also contain communications connection(s) 216 that enable the service computer 200 to communicate with a stored database, another computing device or server, one or more terminal devices, and/or other devices on a network. The service computer 200 may also include input/output (I/O) device(s) and/or ports 218, such as for enabling connection with a keyboard, a mouse, a pen, a voice input device, a touch input device, a display, speakers, a printer, etc.

Turning to the contents of the memory 202 in more detail, the memory 202 may include an operating system 208. One or more application programs or services for implementing the features disclosed herein, including a location assessment module 210, may also be stored in the memory 202. The transaction data 212 and location data 214 may comprise any suitable persistent data storage system. In some embodiments, the transaction data 212 and/or location data 214 may be stored in one or more databases. Information stored in the transaction data 212 or location data 214 may be accessed by the location assessment module 210 via a database query or any other suitable data retrieval means.

In some embodiments, the location assessment module 210 may, in conjunction with the processor 204, be configured to receive two pieces of location data and determine, based on an amount of time between the collection of the two locations, a confidence level associated with a transaction. In some embodiments, the service computer 200 may receive location information from a token server indicating a location reported by a mobile device in a dynamic data request and a time at which the dynamic data was requested by the mobile device. In some embodiments, the service computer 200 may receive location information directly from the mobile device when the dynamic data is requested.

The issuer computer may also receive location information for a transaction conducted using the dynamic data. For example, a terminal may receive the dynamic data or transaction data generated from the dynamic data from a mobile device in order to complete a transaction. In some embodiments, the transaction data may include a cryptogram generated by the mobile device using the dynamic data (e.g., dynamic key such as a limited-use key or access key). The terminal may subsequently provide various transaction details to an acquirer, which may generate an authorization request message to complete the transaction. The authorization request message may include the dynamic data, and/or transaction data generated from the dynamic data (e.g., in the form of a cryptogram) and location information for the transaction. In some embodiments, the location information may be provided by the mobile device. In some embodiments, the location information may be location information associated with the terminal device.

Once an issuer has received an authorization request including the dynamic data or transaction data generated by using the dynamic data (e.g., a cryptogram generated using a dynamic key), and transaction location information, that location information is provided to a location assessment module 210. The location assessment module 210 may calculate a confidence level to be associated with the transaction. For example, an issuer may receive an authorization request message that includes a cryptogram and location information for a transaction. In some embodiments, the service computer 200 may verify the cryptogram by independently generating a cryptogram from the dynamic key associated with the account and compare that cryptogram to the one received in the transaction. In some embodiments, the service computer 200 may decrypt the cryptogram and identify the dynamic key from the decrypted information. In some embodiments, the service computer 200 may determine whether the dynamic key is still valid (e.g., whether one or more limited-use conditions have been met or exceeded) either before or after verifying the cryptogram. Upon determining that the dynamic key is valid, the issuer may query one or more databases to identify a location of the mobile device associated with the generation request for the identified dynamic key. In some embodiments, the service computer 200 may query a token server that generated the dynamic data for the location information provided by the mobile device at the time that the dynamic data was generated. The location assessment module 210 may compare the first location information (location information associated with the mobile device received in a request to generate dynamic data) to the second location information (location information received in the authorization request message) to determine a confidence level associated with the transaction.

In some embodiments, the location assessment module 210 may be configured to evaluate a first location information and a second location with respect to an amount of elapsed time between the collection of the location information. For example, if the first location information indicates that the mobile device was in New York at the time that the dynamic data was requested, and the second location information indicates that a transaction using the dynamic data was conducted in Paris, then a confidence level may be generated for the transaction based on the amount of time between the request for dynamic data and the transaction. In this example, if the transaction occurred a mere two hours after the dynamic data was requested, then the confidence level may be determined to be very low (as it is improbable that the mobile device traveled from New York to Paris within two hours). However, if the transaction occurred 10 hours after the dynamic data was requested, then the confidence level may be calculated as a higher value. In some embodiments, other factors may be used when calculating a confidence level for a transaction. The location assessment module 210 may utilize past transaction data in its calculation of a confidence level. In some embodiments, one or more variables of a function used to calculate the confidence level may be adjusted based on past transaction data. For example, the confidence level in the example given above may be calculated as a higher value if the mobile device frequently conducts transactions from Paris. In another example, the location assessment module 210 may utilize a distance-to-time ratio or a time-to-distance ratio. In some embodiments, an acceptable distance-to-time ratio may be calculated based on past transactions. For example, if the mobile device associated with the transaction typically conducts transactions that are a large distance apart within a short amount of time (which may also indicate that the user of the mobile device is a frequent traveler), then the confidence level may be higher than if the mobile device is associated with a low distance-to-time ratio.

In some embodiments, the confidence level may be determined by the location assessment module 210 as a function of elapsed time. For example, a distance threshold (e.g., a maximum distance value) may be calculated as a predetermined value multiplied by an amount of time that has elapsed between requesting the dynamic data and the transaction. In this example, the distance between the two location information may be compared to the distance threshold to determine a confidence level for the transaction. An authorization entity (e.g., an issuer, or token service provider) may systematically decline transactions for which the distance is greater than the distance threshold. In some embodiments, a distance-to-time ratio may be calculated for a transaction and compared to an acceptable distance-to-time ratio. For example, 100 miles and 10 hours (600 minutes) apart may be interpreted as ⅙ miles per minute. In this example, the location assessment module 210 may identify a predetermined acceptable distance-to-time ratio of ⅓, such that any distance-to-time ratio larger than this value is suspect. A distance-to-time ratio may be specific to a particular user, account holder, mobile device, or dynamic key.

In some embodiments, the transaction data 212 may comprise information on past conducted transactions. In some embodiments, the transaction data 212 may be used to calculate an acceptable value to be used in assessing a distance between two locations and a time between collection of the two locations (e.g., a distance-to-time ratio). In some embodiments, the transaction data 212 may be queried to identify one or more transactions related to a particular individual or account.

In some embodiments, the location data 214 may comprise location information related to a mobile device at the time that the dynamic data is requested, a location at which a transaction was conducted, or both. The location data 214 may comprise a single database table or multiple database tables. For example, location data 214 may comprise separate tables for the location of the mobile device at the time that the dynamic data was requested and the location at which the transaction was conducted. In some embodiments, the location data 214 may comprise information stored at different entities/components of the system. For example, a portion of the location data 214 may be stored at a token server and another portion of the location data 214 may be stored at an issuer computer.

The service computer 200 may represent different components of the system architecture 100 depicted in FIG. 1. It should be noted that the location assessment module 210 may be stored on, and executed from, various components of the system. In some embodiments, the location assessment module 210 may be stored on an issuer computer (e.g., an example issuer computer 110 of FIG. 1). In embodiments in which the location assessment module 210 is stored on, and executed from, an issuer computer, the location included in a request for generation of dynamic data may be provided to the issuer computer (either at the time of the request for generation or upon request by the issuer computer) and the location information related to the transaction may be provided to the issuer computer via an authorization request message. In some embodiments, the location assessment module 210 may be implemented by a token server (e.g., an example token server 108 of FIG. 1). In embodiments in which the location assessment module 210 is stored on, and executed from, a token server, the issuer computer may forward location information from an authorization request to the token server and the location assessment module 210 may determine a confidence level for the transaction by comparing that location data of the transaction to the location data stored at the time of the request for dynamic data. In some embodiments, the location assessment module 210 may be implemented by an application server (e.g., an example application server 106 of FIG. 1). In embodiments in which the location assessment module 210 is stored on, and executed from, an application server, location information may be collected from the mobile device at the time of a request for generation of the dynamic data. The issuer computer may forward location information from an authorization request to the application server, which may then be used by the location assessment module 210 to generate a confidence level.

Figure 3:
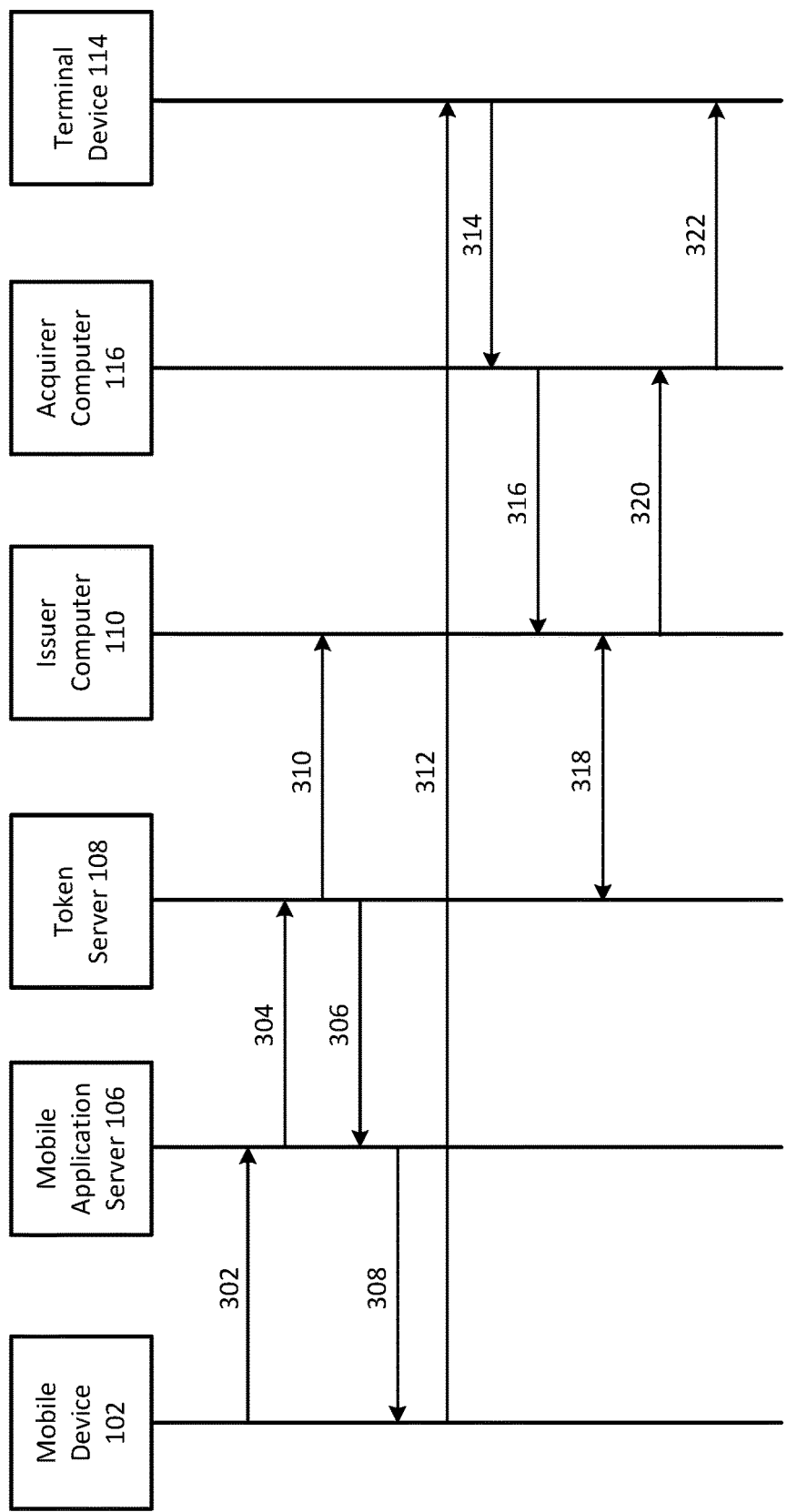
FIG. 3 depicts a communication flow of an example confidence level assessment process in accordance with at least some embodiments.

FIG. 3 depicts a communication flow of an example confidence level assessment process in accordance with at least some embodiments. The confidence level assessment process may be initiated from a mobile device 102 with a mobile application installed, wherein the mobile application includes instructions to communicate with a mobile application server 106. The mobile application may be preinstalled on the mobile device 102 (e.g., by a manufacturer or wireless provider) or it may be downloaded and installed by a user of the mobile device 102. The mobile application may be executed upon initiation by a user of the mobile device 102. For example, the user may open the mobile application on the mobile device 102. In some embodiments, the mobile application may be executed in order to complete a transaction with another electronic device using dynamic data (e.g., dynamic account identifier such as a token, dynamic PAN, etc., and/or dynamic key such as limited-use key or access key, etc.). The user may request the dynamic data using the mobile application or the mobile application may initiate a request for generation of the dynamic data automatically (e.g., without the user initiating the request). Upon execution of the mobile application, the mobile device 102 may transmit a request to the mobile application server 106 to generate the dynamic data at 302. The request may include location information collected using one or more input sensors of the mobile device. Location information collected using the input sensors may include any suitable coordinate based location details (e.g., global positioning data, cell phone tower triangulation data, etc.).

Upon receipt of the request for the dynamic data, the mobile application server 106 may query information related to the mobile device from account data stored at the mobile application server 106. For example, the mobile application server may identify an account associated with the mobile device based on an identifier (e.g., a phone number, serial number, international mobile station equipment identifier (IMEI), or any other suitable identifier). Once identified, the mobile application server may retrieve account information (e.g., a payment account, user identifier, account number, etc.) associated with the identified account. In some embodiments, the mobile application server 106 may also store the received location information in a data store. The mobile application server 106 may subsequently send a request for the generation of the dynamic data to the token server 108 at 304. In some embodiments, the sent request may include additional details (e.g., at least a portion of the retrieved account information). The sent request may also include the location information collected by the mobile device 102.

The token server 108, upon receiving a request to generate the dynamic data, may identify one or more account details related to the mobile device. For example, the token server 108 may identify a payment account associated with the mobile device for which the dynamic data should be generated. In some embodiments, the account information may be identified based on the received request for the dynamic data. In some embodiments, the token server 108 may query a database of account data. The token server 108 may also identify location information related to the request. In some embodiments, the token server 108 may identify this location information in the request itself. In other embodiments, the token server 108 may establish a communication session with the mobile device 102 upon receiving the request for the dynamic data in order to request location information. The dynamic data may include a dynamic key that is generated by the token server 108 based on a key index which acts as a seed for the generation of an dynamic key. Once the dynamic data has been generated, it may be stored in relation to an account associated with the mobile device 102. The dynamic data may also include a dynamic account identifier (e.g., token, or dynamic PAN) that is generated by the token server 108 based on the account associated with the user. Additionally, the token server 108 may respond to the request for the dynamic data form the mobile application server 106 with a response that includes the generated dynamic data at 306. The mobile application server 106 may forward the received dynamic data to the mobile device 102 at 308. The mobile device 102 may subsequently store the received dynamic data in memory for future use. In some embodiments, the functionality of the mobile application server 106 can be integrated with the token server 108, and thus the mobile device 102 can request the dynamic data directly with token server 108.

At 310, the token server 108 may provide location information received in the request for dynamic data generation to an issuer computer 110. In some embodiments, the location information may be provided to the issuer computer 110 upon generation of the dynamic data. In some embodiments, the location information may be provided to an issuer computer 110 upon request or submission of a query.

The mobile device, upon detecting that a transaction is to be completed using the dynamic data, may generate a cryptogram from the dynamic data (e.g., a dynamic key) by encrypting one or more piece of information. In some embodiments, the mobile application may generate a cryptogram from the dynamic key upon execution of the mobile application to complete a transaction. In some embodiments the mobile device 102 may generate a cryptogram upon receiving transaction information from a terminal device 114. For example, the mobile application may be executed on a mobile device 102 and the mobile device may be moved into proximity of a wireless communication interface communicatively coupled to the terminal device 114. In this example, the terminal device 114 may provide transaction details to the mobile device 102 via the wireless communication interface. Upon receiving the transaction details, the mobile application may generate a cryptogram for the transaction. The cryptogram may include the dynamic key and one or more transaction details received from the terminal device 114.

At 312, the mobile device 102 may provide the cryptogram to a terminal device 114 in order to complete the transaction. In some embodiments, the transaction may pertain to a purchase transaction (e.g., a transaction to provide payment for a good or service). In some embodiments, the transaction may be non-financial in nature (e.g., a transaction to access a secure area). In some embodiments, the cryptogram may be provided by the mobile application via a contactless reader communicatively coupled to the terminal device 114. In some embodiments, the mobile application may provide a location of the mobile device to the terminal device 114 along with the cryptogram. In some embodiments, the dynamic data itself can be provided to the terminal device 114. For example, the mobile device 102 may provide a dynamic account identifier such as a token or a dynamic PAN to the terminal device 114 to conduct the transaction. In some embodiments, the mobile device may provide a dynamic account, and a cryptogram generated with a dynamic key.

At 314, upon receiving the cryptogram in relation to the transaction, the terminal device 114 may transmit the dynamic data and/or transaction data generated from the dynamic data (e.g., cryptogram) to an acquirer computer 116. In some embodiments, the terminal device 114 may generate an authorization request message that includes the received dynamic data and/or transaction data generated from the dynamic data (e.g., cryptogram). In some embodiments, the terminal device 114 may forward the dynamic data and/or transaction data (e.g., cryptogram) to the acquirer computer 116 with one or more transaction details and the acquirer computer 116 may generate an authorization request message. In some embodiments, the terminal device 114 may transmit location information received from the mobile device 102 to the acquirer computer 116. In some embodiments, the terminal device 114 may provide its own location information to the acquirer computer 116. For example, the terminal device may be associated with a terminal identifier, and the terminal identifier can be associated with location information that it may retrieve and transmit for each transaction that it conducts.

At 316, the acquirer computer 116 may transmit an authorization request message to the issuer computer 110. In some embodiments, the issuer computer 110 may verify the dynamic data and/or transaction data generated from the dynamic data (e.g., cryptogram), or request token server 108 to do so. In some embodiments, the issuer computer 110 may determine whether any limited use conditions associated with the dynamic data have been met or exceeded. If so, the issuer computer 110 may decline the transaction associated with the authorization request message.

In some embodiments, the issuer computer 110 may assess the location information received in the request to generate the dynamic data, the location information received in the authorization request message, and a difference in time associated with the collection of the two location information to determine a confidence level to associate with the transaction. For example, the issuer computer 110 may send a request to the token server 108 for location information associated with the request for generation of the dynamic data at 318. The token server 108 may retrieve the location information and provide it to the issuer computer 110 in a response to the query. In another example, the issuer computer 110 may have previously been provided with location information associated with the request for generation of the dynamic data (e.g., at 310). The issuer computer 110 may retrieve that location information from a data store in order to calculate the confidence level.

In some embodiments, the issuer computer 110 may provide the location information received in the authorization request message to the token server 108 at 318 so that the token server 108 may calculate a confidence level associated with the transaction. The confidence level may be returned to the issuer computer so that the issuer computer may determine whether to authorize the transaction. In some embodiments, this may be handled by one or more function calls. For example, 318 may represent a call to a function provided by the token server 108 in which the dynamic data and transaction location information are passed as parameters of the function call. Upon initiation of the function, the token server 108 may calculate a confidence level associated with the transaction. The confidence level may be provided to the issuer computer 110 as a return parameter of the function.

The issuer computer 110 may determine whether to authorize or decline the transaction at the terminal device 114. In making the determination, the issuer computer 110 may utilize the calculated confidence level associated with the transaction along with one or more additional factors related to the transaction and/or the account. Based on the determination to authorize or decline the transaction, the issuer computer 110 may generate an authorization response message indicating whether the transaction is approved or declined. The authorization response message may be provided to the acquirer at 320. The authorization response message, or a message derived from the authorization response message, may subsequently be provided to the terminal device 114 at 322.

Figure 4:
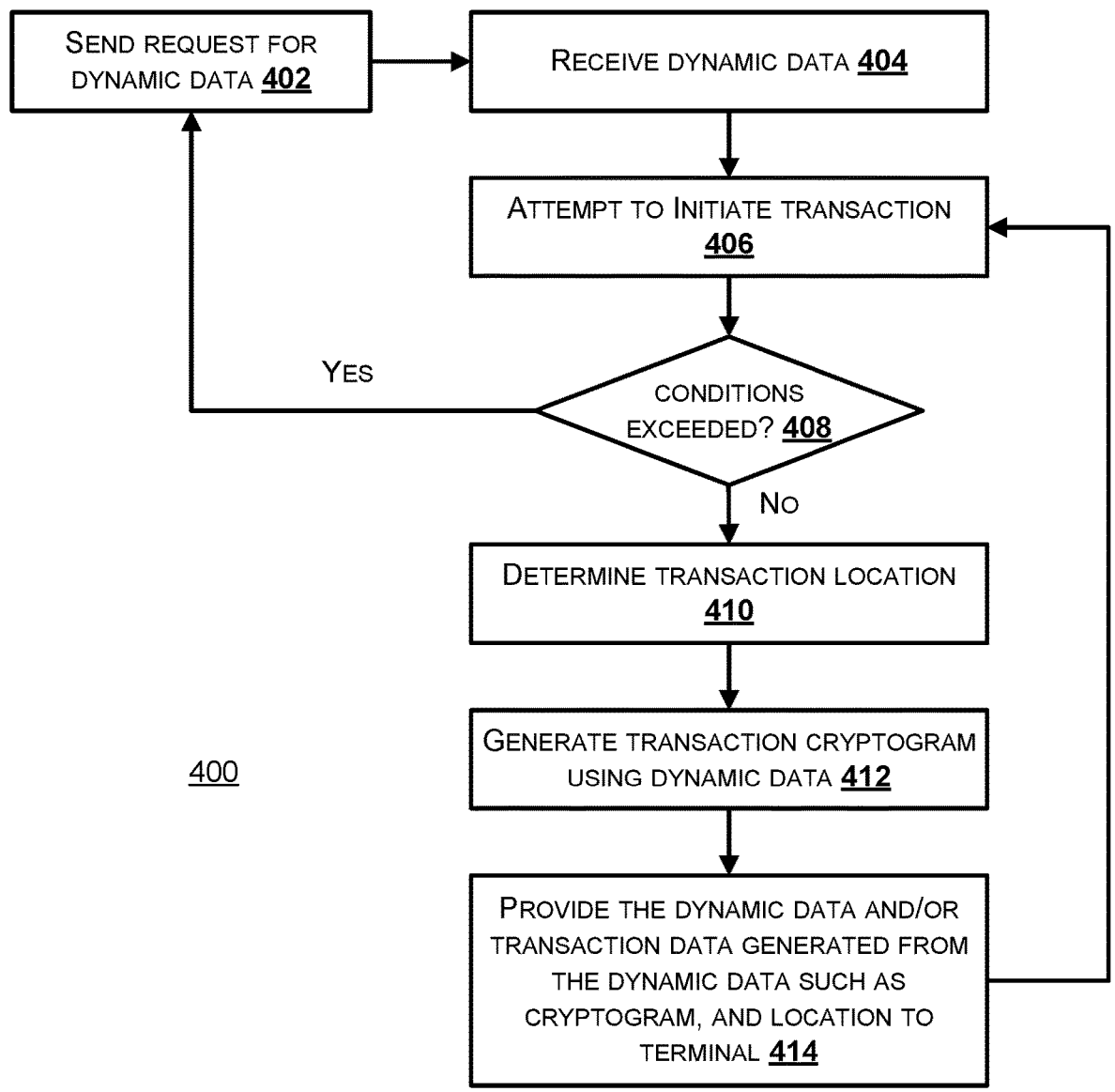
FIG. 4 depicts a flow chart illustrating a process for requesting dynamic data, and conducting a transaction using the dynamic data in accordance with at least some embodiments.

FIG. 4 depicts a flow chart illustrating a process for requesting dynamic data, and providing the dynamic data and/or transaction data generated from the dynamic data in a subsequent transaction. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Process 400 may begin when it is determined that dynamic data is needed by a mobile device in order to conduct future transactions. Upon this determination being made, a request may be sent to a token server for the dynamic data at 402. In one scenario, a mobile application may be installed on the mobile device and upon execution of the mobile application for the first time, the mobile application may submit a request to a mobile application server and subsequently to a token server. In another scenario, a mobile application, mobile application server, or a token server may determine that one or more limited use conditions has been met or exceeded for a currently stored dynamic data (hence the currently stored dynamic data is invalid) and that new replacement dynamic data should be requested. For example, the token server may determine that the dynamic data (e.g., dynamic account identifier or dynamic key) stored on a particular mobile device has expired. Upon making this determination, the token server may notify the mobile device or mobile application to request replacement dynamic data, or may initiate a request to itself to generate new replacement dynamic data.

The mobile device may provide location information associated with its current position in relation to the request for the dynamic data (or replacement dynamic data). In some embodiments, the request for the generation of the dynamic data may be initiated by a mobile application on the mobile device. The mobile device may collect location information from one or more input sensors to which it is communicatively coupled and provide that location information in the request. In some embodiments, the request may be initiated by a token server or an application server. The token server may generate the dynamic data and provide it to the mobile device, and the mobile device may provide location information in response to receiving the dynamic data. In some embodiments, the location information may be stored by the token server. In some embodiments, the location information may be forwarded to the issuer computer and stored thereon.

At 404, the generated dynamic data may be received by a mobile device in response to the request. In some embodiments, the dynamic data may be stored by the mobile device in a secure memory storage. For example, the dynamic data may be stored on an encrypted storage medium. In some embodiments, multiple dynamic data such as dynamic account identifiers and/or dynamic keys may be received by the mobile device. For example, upon receiving the request to generate the dynamic data, the token server may generate a set of limited-use keys to be provided to the mobile device. In some embodiments, the set of limited-use keys may comprise a plurality of one-time use limited-use keys.

At 406, the mobile device may attempt to initiate a transaction using the dynamic data. The mobile device may receive an indication that a transaction is to be completed at a terminal device using the dynamic data. The indication may be provided by a user of the mobile device or a terminal device in communication with the mobile device. In some embodiments, the mobile device may receive transaction information associated with the transaction to be completed. The mobile device may launch the mobile application upon receiving the indication that the transaction is to be completed.

At 408, the mobile application, upon determining that a transaction is to be completed using the dynamic data, may determine whether one or more limited use conditions associated with the dynamic data has been met or exceeded. For example, the mobile application may determine whether a maximum number of uses for the dynamic data has been exceeded. In another example, the mobile application may determine whether an expiration data associated with the dynamic data has passed. In the event that the dynamic data is no longer valid, the process may return to 402, upon which a replacement dynamic data is requested. In this scenario, the location information associated with the request to generate the dynamic data may be updated to the location of the mobile device upon request of the replacement dynamic data.

At 410, the mobile device may determine a current location to be associated with the transaction. In some embodiments, the current location may be collected from an input sensor configured to identify location coordinates of the mobile device (e.g., a global positioning system). Although process 400 depicts location information for the transaction as being associated with a mobile device, in some embodiments the location information for the transaction may be associated with a terminal (e.g., a point of sale terminal or badge reader). Accordingly, some embodiments of process 400 may not include block 410.

At 412, a transaction cryptogram may be generated from the dynamic data (e.g., a dynamic key). In some embodiments, the cryptogram may be generated by encrypting information using the dynamic key as an encryption key. In some embodiments, the information to be encrypted may include the transaction details such as a transaction amount, an unpredictable number received from the terminal, etc. In some embodiments, the information to be encrypted may also include location information for the mobile device. In some embodiments, the cryptogram generation can be optional, for example, when conducting a transaction that does not require a transaction cryptogram.

At 414, the dynamic data and/or transaction data generated from the dynamic data (e.g., cryptogram), and potentially the transaction location, may be provided to a terminal device. In some embodiments, the terminal device may receive the cryptogram from the mobile device and provide it to an acquirer (e.g., a bank entity affiliated with an owner of the terminal device). In some embodiments, the terminal device may provide location information to the acquirer along with the dynamic data and/or transaction data generated from the dynamic data (e.g., cryptogram).

Figure 5:
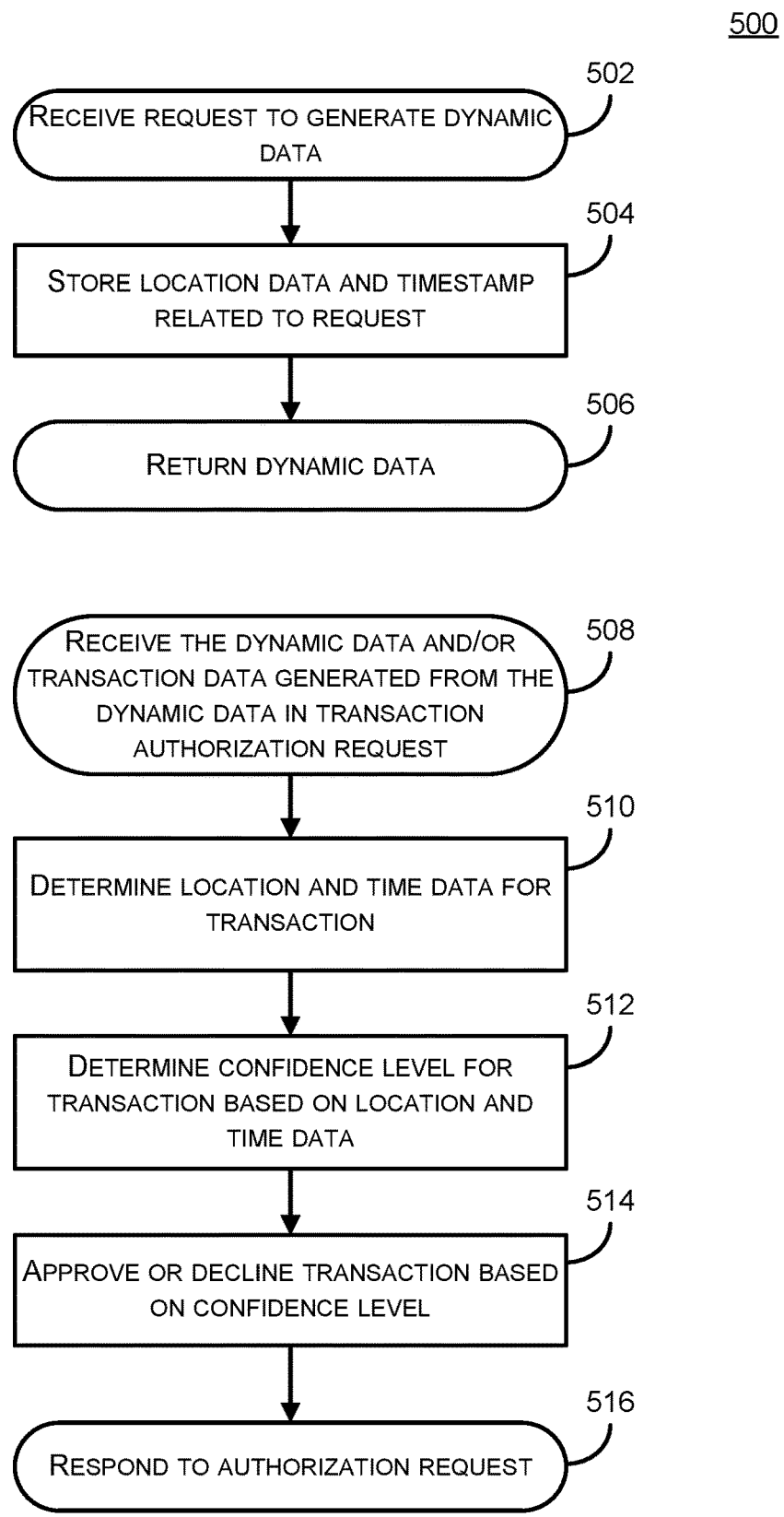
FIG. 5 depicts a flow diagram illustrating a process for providing dynamic data and providing an authorization decision for a transaction in which the dynamic data is used in accordance with at least some embodiments.

FIG. 5 depicts a flow diagram illustrating a process for providing dynamic data and providing an authorization decision for a transaction in which the dynamic data is used in accordance with at least some embodiments.

Process 500 may begin at 502, when a request for dynamic data is received. In some embodiments, the request may be provided by a mobile device (e.g., via a mobile application server). In this scenario, the request may include location information collected by the mobile device. In some embodiments, the request may be generated by a server computer upon determining that the dynamic data has expired or otherwise exceeded its limited use conditions. In this scenario, the server computer may establish a communication session with the mobile device that is to receive the dynamic data in order to collect location information collected by that mobile device. In some embodiments, the request may be received as a function call. For example, the application server (or the mobile device itself) may execute a function on a server computer to generate the dynamic data. In this example, the location of the mobile device may be passed as a function parameter.

At 504, upon receiving a request for the dynamic data, the process 500 may store location data received from the mobile device in a data store associated with a timestamp. In some embodiments, the location data may be stored in a token vault (e.g., the token vault 132 of FIG. 1). In some embodiments, the location information may be stored in a separate database table that includes at least the location, a timestamp, and the dynamic data. In some embodiments, the location information and timestamp may be stored in a database that utilizes a hash index. For example, the dynamic data may be subjected to a hashing function to identify a data storage location for the location information and timestamp. Time information may be noted by a server computer at the time that a request to generate the dynamic data is received.

At 506, the process 500 may transmit the dynamic data to the mobile device. In some embodiments, the dynamic data may be returned as a function parameter. For example, the application server (or the mobile device itself) may execute a function on a server computer to generate the dynamic data. In this example, the dynamic data may be returned to the mobile device via a return parameter.

At 508, a server computer may receive an authorization request associated with a transaction in which the dynamic data has been used. For example, the authorization request may include a cryptogram generated from a dynamic key. In some embodiments, the server computer may independently generate a cryptogram from the dynamic key and compare it to the cryptogram received in the authorization request message. In some embodiments, the server computer may identify the dynamic key upon decryption of the cryptogram. The authorization request may be received from a terminal device (e.g., a point of sale device). The authorization request may be forwarded to the server computer by one or more intermediary entities that handle the authorization request between the terminal device and the server computer.

At 510, the process 500 may comprise determining the location information and time data for the transaction. In some embodiments, the location associated with the transaction may be provided by the terminal device. For example, the terminal device may provide GPS coordinates in the authorization request. In some embodiments, the location may be determined from a lookup table or index. For example, the authorization request may include a terminal identifier associated with an access device or point of sale used in the transaction, and the terminal identifier may be queried against a database table that includes location information associated with various terminal devices. In this way, the database table may be used to determine a location of the terminal device. In some embodiments, the location associated with the transaction may be provided by the mobile device. For example, the mobile device may generate a cryptogram that includes current location information collected by the mobile device. The server computer may identify the location information associated with the transaction upon decrypting the cryptogram. Time information associated with the transaction may be noted by a server computer at the time that an authorization request message is received for a transaction.

At 512, upon determining location and time data for the transaction, that information may be compared to the stored location and time data in order to determine a confidence level associated with the transaction. In some embodiments, the location data associated with the transaction may be subtracted from the location data associated with the request for the dynamic key. The resulting distance may then be divided by a difference in time between the request for the dynamic data and the transaction to identify a value representing a speed of the mobile device. The value may be presented as a distance-to-time ratio. In some embodiments, this distance-to-time ratio may be compared to a threshold value (e.g., an acceptable value) in order to determine a likelihood that the transaction was conducted using the mobile device. In some embodiments, the distance-to-time ratio may be compared to a range of acceptable values in order to determine whether the distance-to-time ratio falls within that range. In some embodiments, additional factors may be used to calculate a confidence level. For example, the confidence level may be determined based on verification of the transaction cryptogram received at 508.

In some embodiments, a confidence level may be calculated as a mathematical function of the locations and timestamps associated with the dynamic data. By way of illustration, location information may be expressed as coordinates on a map (e.g., latitude and longitude). Accordingly, the distance between a first location and a second location may be expressed as:

$$D_L = \sqrt{[(X_2-X_1)^2 + (Y_2-Y_1)^2]}$$

Where $D_L$ is the distance between the two locations, $X_1$ and $X_2$ are latitudes for the respective locations, and $Y_1$ and $Y_2$ are longitudes for the respective locations. Once a distance has been determined, the server computer may relate that distance to a time between the two requests.

In some embodiments, a distance threshold may be calculated as a function of time. The distance $D_L$ associated with the transaction may then be compared to the calculated distance threshold. For example, a distance threshold may be calculated as:

$$D_T = DPT*(T_2-T_1)$$

Where is a distance threshold, DPT is a distance-per-time value (e.g., a predetermined multiplier comprising distance units in the numerator and time units in the denominator), and $T_1$ and $T_2$ are respective times associated with the requests. In some embodiments, the distance threshold may represent the maximum distance that may be associated with the use of the dynamic data. For example, in some embodiments, a distance ($D_L$) value that is greater than the distance threshold ($D_T$) may result in an automatic decline of the transaction. In some embodiments, a confidence level may be determined by comparing the distance to the distance threshold. For example, the distance ($D_L$) may be subtracted from the distance threshold ($D_T$) to get a confidence level. In this example, the confidence level may be a negative value.

In some embodiments, the distance is related to time in order to determine whether it would be feasible or likely for the mobile device to be involved with both requests. For example, a distance-to-time ratio may be expressed as:

$$DT_T = D_L/(T_2-T_1)$$

Where $DT_T$ is the distance-to-time ratio for the current transaction, $D_L$ is the distance between the two locations, and $T_1$ and $T_2$ are respective times associated with the requests. In some embodiments, $DT_T$ may be expressed as a fraction or ratio. In some embodiments, $DT_T$ may be expressed as a decimal value. It should be noted that any comparison of a distance between the two location information with respect to time should be treated as being equivalent to the above distance-to-time ratio.

In some embodiments, a confidence level may be calculated as having an inverse relationship to the calculated distance-to-time ratio (e.g., a higher distance-to-time ratio will result in a lower confidence level for the transaction). For example, one potential function that may be used to calculate a confidence level based on the calculated distance-to-time ratio is:

$$C_T = M(1/DT_T) + C_B$$

In this example function, $C_T$ represents a confidence level for the transaction, M represents a predetermined multiplier, $C_B$ represents a base confidence value, and $DT_T$ represents the distance-to-time ratio for the current transaction. In some embodiments, the multiplier (M) may be equal to 1. In some embodiments, the base confidence value ($C_B$) may be equal to 0 (zero).

In some embodiments, the confidence value may be calculated based on an acceptable distance-to-time ratio. For example, the confidence level may be calculated as:

$$C_T = M(DT_A-DT_T) + C_B$$

Where $DT_A$ is an acceptable distance-to-time ratio. It should be noted that one skilled in the art would easily recognize a number of potential functions for performing an equivalent calculation.

At 514, once a confidence level for the transaction has been determined, the confidence level may be used to approve or decline the transaction. For example, if the confidence level is below a minimum confidence level, then the transaction may be declined. In some embodiments, the confidence level may only be one factor of many that is used to approve or decline the transaction. For example, even if the confidence level for a transaction is very high, the transaction may still be declined if the account associated with the dynamic key has insufficient funds. In some embodiments, the confidence level may take into account traffic patterns in the vicinity of the transaction and/or the time of day.

At 516, upon determining whether the transaction is to be approved or declined, the process 500 may respond to the authorization request message with an authorization response message. For example, an authorization response message may be generated to include an indication that the transaction is approved or declined. The authorization response message may be transmitted to the terminal device associated with the transaction either directly or by transmission to an intermediary entity. In some embodiments, the process 500 may provide access to a resource upon determining that a transaction is approved. For example, upon determining that a confidence level associated with a transaction exceeds a minimum threshold confidence, a user may be granted entry to a secure area or storage location.

By way of illustration of the above described process 500, consider an example scenario in which dynamic key is requested and subsequently used in a transaction. Consider a scenario in which Mr. Smith, who maintains an account with a token service, requests dynamic data (e.g., dynamic account identifier and/or dynamic key) for his mobile phone so that he may conduct token-related transactions using that phone. In this scenario, Mr. Smith may not need to take an active step to initiate the request. For example, a request may be automatically generated by Mr. Smith's mobile phone upon installation of a mobile application used to conduct token-related transactions. To request the dynamic data, an application on the mobile phone may interact with a backend server that supports the application (e.g., a mobile application server), and may provide GPS coordinates collected by the mobile device in the request. The backend server may subsequently request the dynamic data from the token service with which Mr. Smith has an account. The token service may subsequently identify one or more payment accounts associated with Mr. Smith and may generate the dynamic data tied to one or more of those payment accounts. The time at which Mr. Smith's request and the GPS coordinates of the mobile phone are then stored by the token service in this scenario. For illustrative purposes, assume that the location associated with the token request is in San Francisco and the time is Jan. 1, 2016 at 12:00 pm.

Continuing with the above scenario, the token service may receive an indication that the dynamic data has been used in a first transaction in Palo Alto (33.3 miles from San Francisco) on Jan. 1, 2016 at 2:00 pm. For example, a cryptogram may have been provided to a terminal device in Palo Alto to complete a transaction. Upon decrypting the cryptogram or verifying the cryptogram, it may be determined that the crytogram was generated with Mr. Smith's dynamic key. Accordingly, the distance between the requests is approximately 33.3 miles and the time between the requests is 2 hours (120 minutes), resulting in a distance-to-time ratio of 33.3/120 (i.e., $DT_T$=0.2775). For purposes of this example, assume that a base confidence value ($C_B$) is 50 and the multiplier (M) is 10. Using the previously mentioned formula, a confidence level of the first transaction may be calculated as $C_T$=10*(1/0.2775)+50, or 86.04. This confidence level may then be used to approve or decline the first transaction.

Continuing with the above scenario, the token service may receive an indication that the dynamic data has been used in a second transaction in Seattle (680.05 miles from San Francisco) on Jan. 1, 2016 at 4:00 pm. Accordingly, the distance between the requests is approximately 680.05 miles and the time between the requests is 4 hours (240 minutes), resulting in a distance-to-time ratio of 680.05/240 (i.e., $DT_T=2.834$). Using the assumptions above, a confidence level of the second transaction may be calculated as $C_T=10*(1/2.834)+50$, or 53.53. This confidence level may then be used to approve or decline the second transaction. As demonstrated by these examples, a higher distance-to-time ratio may result in a lower overall confidence level.

It should be noted that the illustrative scenarios presented above represent a simplified, and hence less precise, embodiment of the disclosure. It should be noted that any number of additional factors may be used to determine a confidence level associated with a transaction. For example, in the scenario above, information related to Mr. Smith's past transactions may also be used to determine the confidence level of the transaction. In some embodiments, an acceptable distance-to-time ratio may be calculated for Mr. Smith based on past transactions.

Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the mobile device 102 depicted in FIG. 1. In accordance with at least one embodiment, the process 500 of FIG. 5 may be performed by at least the service computer 200 depicted in FIG. 2. The code may be stored on a computer-readable storage medium, for example, in the form of a computer program including a plurality of instructions executable by one or more processors. The computer-readable storage medium may be non-transitory.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention provide for improved fraud determination capabilities. For example, authorizing entities are better able to determine a likelihood that a user is the one for whom an dynamic key has been generated based on a distance-to-time ratio. Additionally, a service computer is better able to track user's purchase/travel patterns. In doing so, the service computer may also develop a distance-to-time ratio specific to a particular user, improving fraud analysis even further.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
 receiving, by a server computer from a mobile device, a request for dynamic data, the request including a first location information associated with the mobile device, the first location automatically obtained from a GPS device on the mobile device, wherein the dynamic data is an encryption key;
 storing the first location information and associating the first location information with the dynamic data;
 transmitting the dynamic data to the mobile device;
 receiving an authorization request message for a transaction, the authorization request message comprising transaction data encrypted using the dynamic data;
 decrypting the transaction data to identify a second location information associated with the mobile device at a time of the transaction included in the transaction data;
 determining, a distance-to-time ratio threshold for a user associated with the transaction, wherein the distanceto-time ratio threshold is specific to the user and determined based on past transactions for the user;

determining a distance between a first location corresponding to the first location information associated with the request for dynamic data and a second location corresponding to the second location information associated with the transaction;

determining a confidence level for the transaction based at least in part on a comparison between the distance-to-time ratio threshold and a distance-to-time ratio derived from the determined distance and an amount of time between receiving the request for dynamic data and receiving the authorization request message; and causing the transaction to be approved or declined based on whether the confidence level for the transaction is above a threshold confidence level.

2. The method of claim 1, wherein the transaction data includes a transaction cryptogram, and the dynamic data is used by the mobile device to generate the transaction cryptogram.

3. The method of claim 2, wherein determining a confidence level for the transaction is further based on verification of the transaction cryptogram.

4. The method of claim 1, wherein the encryption key is a limited-use key (LUK).

5. The method of claim 1, wherein the dynamic data includes a dynamic account identifier.

6. The method of claim 1, wherein the second location information includes a terminal identifier associated with an access device used in the transaction, and the terminal identifier is used to determine the second location.

7. The method of claim 1, wherein the distance-to-time ratio is calculated based on a first time information associated with when the dynamic data is requested, and a second time information associated with when the transaction is conducted.

8. The method of claim 1, wherein determining a confidence level for the transaction comprises using a function in which the confidence level has an inverse relationship to the distance between the first location and the second location.

9. A system comprising:

a processor; and a memory including instructions that, when executed with the processor, cause the system to, at least:

receive, from a mobile device, a request for dynamic data, the request including a first location information automatically obtained from a GPS device of the mobile device, wherein the dynamic data is an encryption key;

store the first location information and associate the first location information with the dynamic data;

transmit the dynamic data to the mobile device;

receive an authorization request message for a transaction, the authorization request message comprising transaction data encrypted using the dynamic data;

decrypt the transaction data to identify a second location information associated with the mobile device at a time of the transaction included in the transaction data;

determining, a distance-to-time ratio threshold for a user associated with the transaction, wherein the distance-to-time ratio threshold is determined based on past transactions for the user;

determine a distance between a first location corresponding to the first location information associated with the dynamic data and a second location corresponding to the second location information associated with the transaction;

determine a confidence level for the transaction based at least in part on a comparison between the distance-to-time ratio threshold and a distance-to-time ratio derived from a first location corresponding to the first location information and a second location corresponding to the second location information; and cause the transaction to be approved or declined based on whether the confidence level for the transaction is above a threshold confidence level.

10. The system of claim 9, wherein the dynamic data includes at least one of a dynamic account identifier or a dynamic key.

11. The system of claim 10, wherein the dynamic data includes a dynamic key that is associated with one or more limited-use conditions that limit usage of the dynamic key.

12. The system of claim 11, wherein the instructions further cause the system to, upon determining that the one or more limited-use conditions are no longer met:

notify the mobile device to request a replacement dynamic key;

provide the replacement dynamic key to the mobile device upon receiving a request for the replacement dynamic key; and update the first location information based on new location data provided in the request for the replacement dynamic key.

13. The system of claim 9, wherein the confidence level is determined using a function in which the confidence level has an inverse relationship to a distance between the first location and the second location.

14. The system of claim 9, wherein the distance-to-time ratio threshold is specific to the dynamic data.

15. The system of claim 9, wherein the authorization request message for the transaction is associated with a request to access a secure area or storage location.

* * * * *